Patented Aug. 10, 1943

2,326,471

UNITED STATES PATENT OFFICE 2,326,471

COMPOSITION AND METHOD

John F. Lontz, Wilmington, Del., assignor to E. I. du Pont de Nemours & Company, Wilmington, Del., a corporation of Delaware No Drawing. Application February 20, 1942,
Serial No. 431,693

26 Claims. (Cl. 47—58)

This invention relates to plant regulants and is particularly directed to plant stimulant compositions containing as an essential active ingredient a monocarboxylic acid having a non-carboxyl hydrogen replaced by an aromatic ring having a nuclear halogen substituent, and more particularly to such compositions in which an essential active ingredient is an aliphatic monocarboxylic acid having a non-carboxyl hydrogen replaced by an aromatic ring having a nuclear halogen substituent and to methods in which the growth characteristics of plants are modified by the application of such compounds.

In the science of phytology, or plant physiology, it is universally recognized that certain factors regarded as growth regulators or growth-promoting substances are responsible for the fundamental and directive development of plant life. These regulators have been isolated from vegetative and reproductive parts of a variety of plants, pollens, the endosperm of many seeds, fungi, and urine and have been identified as to their chemical structure. In addition, a number of synthetic compounds displaying regulatory effects similar to those of the naturally occurring products have also been discovered. These plant growth substances, also known as auxins, plant hormones, plant growth stimulants, and referred to herein simply as "plant regulants," in very minute quantities control or regulate the growth of the plant cell, a property which can be determined qualitatively and quantitatively by such standard test procedures known as the Avena coleoptile curvature test of Boysen-Jensen ("Growth Hormones in Plants," translated and revised by G. S. Avery, Jr., and P. R. Burkholder; McGraw-Hill, New York), the Avena cylinder or straight growth test of Thimann (Proc. Acad. Sci., Amsterdam vol. 38, p. 896–912 (1935)), the split pea stem curvature test of Went (Proc. Acad. Sci. Amsterdam vol. 37, p. 547 (1934)), and the green tissue test of Hitchcock & Zimmerman (Contributions from Boyce-Thompson Institute, vol. 9, No. 5, p. 463–518 (1938)).

While fundamentally these substances control the development of the cell, particularly its elongation and division, the total or superficial responses to these substances are manifested in such various ways as inducing nastic movement, bending and swelling, proliferation, and overgrowth of leaves and stems, control of root growth, development of callous tissue, increased cambial activity, deposition of new cell wall and abscission tissue, and the initiation of new roots on stems and leaves. The practical aspects of these properties include propagation of plants from cuttings, hastening of flower bud formation, "hormonization" of cereal grains for controlling germination and growth, parthenogenic development of fruit, delaying or controlling the fall of leaves, buds and fruit, and inhibiting sprouting, budding, or flowering.

In the successful application of plant regulants to various of these purposes it is important that the concentration of the compound in a suitable treating medium and the time of treatment, both of which, particularly with some compounds, are highly critical, be adjusted carefully. If this concentration/time factor is exceeded by using either a higher concentration or longer treating time the regulating effect may vanish and instead considerable injury to the plant develop.

Of the various types of known plant regulants a summary of which may be found in U. S. Patent 2,220,505, 1-naphthaleneacetic acid has probably obtained the most significance in the art. On the basis of cost efficiency and ease of synthesis it appears to be most outstanding, yet its synthesis is by no means simple and its range of tolerance is too sharp to provide sufficient margin of safety in the hands of unskilled workmen.

I have now found that monocarboxylic acids having a non-carboxyl hydrogen replaced by an aromatic ring having a nuclear halogen substituent have plant regulating properties. I have found particularly that the arylaliphatic monocarboxylic acids which contain a nuclear halogen substituent have plant regulant properties. My observations indicate that the nuclear halogen substituent intensifies weak or latent hormone-like activity of the parent compound or imparts hormone-like activity without apparently affecting the plant tolerance so that the nuclear halogenated compounds of my invention may be applied to plants for the purpose of regulating the growth characteristics with a large measure of success and a wide margin of safety.

The monocarboxylic acids having an aromatic ring substituted by a nuclear halogen substituent are compounds having the general formula $X_nRYCOOH$ in which X represents halogen, $n$ is an integer preferably not greater than 2, R is an aromatic ring, Y represents a bivalent organic, preferably aliphatic, radical having acyclic attachment to R and preferably of not more than 9 carbon atoms, and COOH represents a carboxyl group, free or combined as in the esters, amides or salts.

Thus X may be any of the halogens, chlorine, bromine, iodine, or fluorine, the preferred halogen being chlorine or bromine, of which the more preferred is chlorine. From the standpoint of the number of halogens on the aromatic ring as represented by the integer $n$, it is preferable that the number be not greater than 2, still more preferably that it be one. The reason for this preference is the fact that injury to plants appears to increase with the increasing number of halogens, the greater the number the greater the injury. In the case of monohalogen derivatives substituents in the ortho- and para-positions are preferred to those of the meta. Mixtures of these position isomers are suitable for this use.

The radical R may be an aromatic radical such as phenyl, naphthyl, phenanthryl, anthracyl, indolyl, quinolinyl, etc., phenyl being the preferred type. The radical Y may be such diverse bivalent groups as —$(CH_2)_n$—, ($n$ is an integer preferably 1 and not more than 9), —CH=CH— —CHOH—, —CO—,

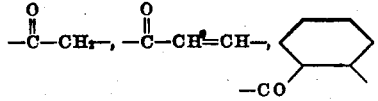

—$OCH_2$—, —$NHCH_2$—, —$SCH_2$—. The group —YCOOH is preferably the radical of an aliphatic monocarboxylic acid having less than 9 carbon atoms. By radical of a monocarboxylic acid is meant the radical left when non-carboxyl hydrogen is removed. Unless the free acid is specified it is intended that the esters, amides and salt, preferably the water-soluble types, are included by reason of equivalency. For example, the acid may be "combined" as the sodium or potassium salt, the unsubstituted amide or the esters of lower aliphatic alcohols.

Those plant regulant acids which are characterized by an aromatic group are generally intensified in their activity by the presence of nuclear halogen substituents. Those possessing weak or latent hormone-like properties, like phenyl acetic acid for example, are markedly intensified in their ability to regulate plant growth whereas those already possessing strong hormone-like properties, like 1-naphthaleneacetic acid for example, are at best only slightly affected. If limits of possible hormone-like activity for a plant regulant are postulated it is evident that those, such as 1-naphthalene-acetic acid, which are near the maximum are not susceptible to intensification in a degree anything like those, such as phenyl-acetic acid, which are near the minimum. In this manner relatively ineffective material such as phenyl acetic acid may be given a potency comparable to that of 1-naphthaleneacetic acid and of indolebutyric acid, and at the same time a simpler and more efficient synthesis and a greater margin of safety to sensitive plants are provided. In a like manner compounds which are not recognizable as having plant regulating properties may have their latent hormone-like activity so intensified as easily to be recognized as having such properties and to be of value in regulating the growth characteristics of the plant. This intensifying action of the halogen atom is observed in a large variety of acids including not only the arylacetic acid type mentioned but also the aryloxyacetic, the aryliminoacetic, the arylketo aliphatic and the arylketo aromatic acid types. This intensifying action of the nuclear halogen is not shared by other nuclear substituting groups such as alkyl, hydroxy, methoxy, amino, aryl, alkylamino, nitro, carboxyl, etc.

The compounds of my invention may be prepared by known synthesis, for example, by direct chlorination of the parent acid or by the interaction of suitable components one of which contains a halogenated aromatic nucleus. By any suitable method a chlorine, bromine, iodine or fluorine atom may be introduced as a nuclear substituent. The substitution may be ortho-, meta- or para-, but preferably ortho- or para-. More than one halogen atom may be introduced, but this is generally undesirable in view of increased tendency toward plant injury. Chlorine is the preferred halogen not only because of greater economy but because of greater tolerance by plant foliage. For example, in the aryloxyacetic acid series the extent of injury proceeds as follows: I>Br>Cl. Mixtures of the different position isomers are included as well as compounds containing two or more types of halogen substituents. The following compounds are illustrative:

2-chlorophenylacetic acid
3-chlorophenylacetic acid
4-chlorophenylacetic acid
2-bromophenylacetic acid
3-bromophenylacetic acid
4-bromophenylacetic acid
2-iodophenylacetic acid
Alpha-(2-chlorophenyl) propionic acid
Alpha-(4-chlorophenyl) propionic acid
Gamma-(2-chlorophenyl) butyric acid
Gamma-(4-chlorophenyl) butyric acid
2-(4'-chlorobenzoyl) benzoic acid
Beta-(4-bromophenyl) acrylic acid
2-chloromandelic acid
4-chloro-1-naphthaleneacetic acid
Beta-(4-chlorobenzoyl) propionic acid
Delta-(4-bromobenzoyl) valeric acid
Beta-(4-bromobenzoyl) acrylic acid
4-chlorophenoxyacetic acid
4-bromophenoxyacetic acid
4-chlorophenylglycine The compounds of this invention may be used in a variety of ways to regulate the growth characteristics of the plant. For example, they may be applied to cuttings to stimulate root formation; they may be applied to fruit trees to delay or prevent preharvest drop; they may be applied to ornamental plants to delay fall of leaves and needles; they may be applied to seed tubers and the like for regulating germination to stimulate or inhibit sprouting or to stimulate development of roots; they may be used for "fortifying" fertilizers and plant food; and they may be used in the production of parthenocarpic or seedless varieties of fruits and berries. In their various applications they may be used on seeds or mature plants to regulate the development of the plants when desired to avoid drought, frost and other adverse conditions, or to stimulate root activity in cuttings or transplanted plants, or to modify the abscission cells to prevent premature drop of buds, leaves, and fruit, particularly apples. In all their applications they are applied to living plant cells in such concentrations as will regulate or control the growth characteristics of the plant. For the purpose of this invention it will be understood that the term "plant" as used herein and in the appended claims is intended to include seeds.

In the application of the compound for these various purposes different compositions may be employed. For the most part aqueous solutions will be found most desirable. These solutions may include wetting agents or adhesives, or both.

Colloidal materials such as the soluble gums or resins may be included; also, water-soluble polymers such as polyvinyl alcohol. The compounds also may be applied in admixture with other diluents either as pastes or dusts. Thus the materials may be incorporated in oils, fats, or similar vehicles such as lanolin, olive oil, paraffin oil, lard or hydrogenated vegetable oils, or in a finely divided inert material such as talc, flour, fuller's earth, clay or other soluble or insoluble finely divided solids.

According to one form of my invention the compound is applied to cuttings. Typical applications are given in the following examples:

Example 1

Two series of 31-34 carnation cuttings are soaked for 3½ hours at room temperature with an aqueous solution containing 15 milligrams of 2-chlorophenylacetic acid and 4-chlorophenylacetic acid per liter, while a third series is soaked in water only for purposes of control. The cuttings are then placed in clean sand and watered occasionally. After several weeks the cuttings are examined for the extent of rooting. The results are indicated by the following table:

| Series | Extent of rooting | | | |
|---|---|---|---|---|
| | Heavy | Medium | Light | None |
| Water check | 0 | 16 | 16 | 2 |
| Treated with 2-chlorophenylacetic acid | 7 | 21 | 3 | 1 |
| Treated with 4-chlorophenylacetic acid | 7 | 19 | 5 | 0 |

Example 2

Two series of 6-7 Fuchsia cuttings are treated in the same manner as described in the above Example 1. The results of this treatment are summarized as follows:

| Series | Extent of rooting | | | |
|---|---|---|---|---|
| | Heavy | Medium | Light | None |
| Water check | 0 | 2 | 1 | 4 |
| Treated with 4-chlorophenylacetic acid | 6 | | | |

These results show definite stimulation of root growth as evidenced by the larger number of heavy rootings and illustrate the application of the invention to the propagation of plants from cuttings. This treatment is equally applicable to other varieties of plants and is useful for the propagation of not only the ornamental and flowering variety of plants such as holly, Taxus, Forsythia, Althea, barberry, quince, Hydrangea, lilac, privet, rose, Spirea, bittersweet and others, but also for economically important plants such as apple, grape, citrus, peach, pear, etc. For such propagations either dilute aqueous solutions of the synthetic plant hormone in concentrations ranging from 3 to 200 milligrams per liter or compounded dusts or powders containing 0.1 to 5 per cent or more of the active ingredient may be used. The concentration will necessarily depend upon the variety or species of plants, which of course vary in their sensitivity to such treatment. The duration of treatment or exposure to these stimulants will vary from about 1 hour to 2 or more days, again depending upon the plant and the concentration.

In comparing the intensity of the hormone-like activity of compounds it is customary to apply lanolin pastes of the compound to two-week old tomato seedlings. The paste is applied to the stem at and below the highest branch or internode by means of a glass rod. Typical hormone-like effects are characterized by epinasty of the leaves and curvature of the stem occurring within several hours and by callous tissue developing at the point of application after several days. Such hormone-like responses characterize 2-chlorophenylacetic acid, 4-chlorophenylacetic acid, 2-chloromandelic acid, 4-chloro-1-naphthaleneacetic acid, 4-bromophenoxyacetic acid, 4-chloro-phenylglycine, beta-(4-bromobenzoyl)-acrylic acid and beta-(4-chlorobenzoyl) propionic acid. In general the response obtained is much more intense than with the parent unhalogenated compound. Thus the hormone-like responses of 2-chloro- and 4-chlorophenylacetic acid at ½ of 1 per cent concentrations are much more intense than those caused by phenylacetic acid at double the concentration. Similarly mandelic acid does not produce nearly as pronounced an effect at 5 per cent concentration as does 2-chloromandelic acid at the same concentration.

The superficial effects characterized by swelling, twisting, and bending of the test plant and development of callous tissue are presumably due to some specific action on the cellular development of the plant, particularly the cell wall tissue. For this reason, the synthetic plant hormones are effective in regulating the deposition of abscission tissue connecting the plant organs, leaves, blossoms, and fruit to the plant stem or stamen. From the practical standpoint, therefore, the present synthetic plant hormones are useful in controlling or delaying the fall of leaves, blooms, and fruit. The following example illustrates an important application to cut evergreens such as Christmas trees:

Example 3

A number of white spruce (New Hampshire) limbs are thoroughly sprayed with a 1/10,000 water solution of various halogenated plant hormones of this invention and then placed in a constant temperature room running at 82° F. and about 30 per cent relative humidity. For purposes of comparison, a control group is simply sprayed with water. Six days later the weight of drop needles and needles remaining on the limbs is determined and the per cent of drop calculated. The results are summarized as follows:

| Treatment | Percent drop |
|---|---|
| 2-chlorophenoxyacetic acid | 5.7 |
| 4-chlorophenoxyacetic acid | 12.1 |
| 2-(4'-chlorobenzoyl) benzoic acid | 7.4 |
| Water check | 100.0 |

It will be seen from the above table that the abscission of the needles in terms of per cent drop is decreased appreciably by treatment with the present synthetic hormones, thus extending the good appearance of such cut ornamental plants.

The present compounds can also be applied to plants not only for delaying the abscission of leaves and needles but also for preventing the premature fall of fruits, particularly apples. For such an application, the compounds are applied several days in advance of the time at which these falls are apt to occur. Such varieties of apple as Stayman Winesap, Delicious, McIntosh and Williams are effectively prevented from premature falling or wind falling by this treatment. The application is carried out by mixing the compound with a suitable diluent or powdery carrier and thus may be sprayed or dusted on the plant or tree. For spraying purposes, a water solution suspension, or emulsion containing from 1 to 200 grams per 100 gallons of water or approximately a dilution of from 1/400,000 to 1/2,000 can be used. With such sprays may be incorporated other adjuvants serving to improve contact and coverage on the tree or plant. Compositions of talc, clay, flour, and the like, containing from 2 to 100 parts per 100,000 can also be used. Such compositions may vary in these limits depending upon the type of plant, time and frequency of treatment. In some cases even lower or higher concentrations may be necessary.

The compounds of this invention are also useful in regulating the germination of seeds and tubers as well as the growth of plants therefrom. For this purpose, they may be applied by either mixing the seeds with dusts made from talc, clay, or flour or by immersing the seeds in dilute aqueous solution or suspension. The treatment of seeds may also be carried out simultaneously with any treatments for preventing rot or any fungus attack on the seeds. In applying the dust treatment the concentration of active ingredient should be from 0.5 to 5 per cent, while a much lower concentration will suffice for the aqueous solution, namely from 0.005 to 0.5 per cent.

Another method for regulating plant growth by the use of the present compounds consists of incorporating these haloaryl-substituted monocarboxylic acids in fertilizers and plant foods or nutrients such as manure, bone meal, peat, ground hulls, dried blood, ground phosphate, potash, and urea products. This may be regarded as fortifying the plant foods. To obtain a uniform mixture, the present compounds may be added in pure form or, preferably, diluted with a dust or water solution, dusted or sprayed into the fertilizer and then mixed either by spading or, with large quantities, in the usual types of mixing mills. For such hormonized fertilizers, the suitable concentrations will range from 0.002 oz. to 0.2 oz. per ton of fertilizer.

Another application of the synthetic plant hormones for which the present compounds are also particularly suitable is the production of parthenocarpic or seedless variety of fruit. This is accomplished more expeditiously, particularly on large scale, by spraying the flower buds, preferably several times while flowering continues, with dilute aqueous solutions of the compounds, ranging from a concentration of 0.05 to 1.0 g. or more per liter. The concentration for the optimum results will vary with the variety of plant, season, frequency of treatment, etc. Parthenocarpic or seedless fruit can thus be developed in the case of such plants as tomato, squash, cucumber, watermelon, pepper, eggplant, etc.

While I have disclosed my invention with reference to particular applications it is to be understood that it is not limited in these respects but is directed to the application of the particular regulant described in any manner which leads to alteration, i. e., regulation and control, of the growth characteristics of plants. The general characteristic of a plant stimulant is that of modifying the development of the plant, not simply as in the case of a fertilizer by providing a more proper food but actually by altering and controlling the growth characteristics of the plant in the various ways already set forth, nor are they to be confused with plant poisons which simply alter and destroy. Additionally, the plant stimulant is effective in minute amounts, the effective concentration being easily set forth in parts per million or milligrams per liter.

Since many widely differing embodiments of the invention may be made it is to be understood that such modifications as come within the spirit of the invention are intended to be included within the scope of the claims.

I claim:

1. A plant regulant composition containing as an essential active ingredient a monocarboxylic acid having a non-carboxyl hydrogen replaced by an aromatic ring having a nuclear halogen substituent.

2. A plant regulant composition containing as an essential active ingredient a monocarboxylic acid having a non-carboxyl hydrogen replaced by a benzene ring having a nuclear halogen substituent.

3. A plant regulant composition containing as an essential active ingredient an aliphatic monocarboxylic acid having a non-carboxyl hydrogen replaced by a benzene ring having a nuclear chlorine substituent.

4. A plant regulant composition containing as an essential active ingredient an aliphatic monocarboxylic acid having at least two and not more than nine carbon atoms and having a non-carboxyl hydrogen replaced by a benzene ring having a nuclear halogen substituent.

5. A plant regulant composition containing as an essential active ingredient acetic acid having a non-carboxyl hydrogen replaced by a benzene ring having a nuclear halogen substituent in not more than two positions.

6. A plant regulant composition containing as an essential active ingredient acetic acid having a non-carboxyl hydrogen replaced by a benzene ring having a nuclear chlorine substituent.

7. A plant regulant composition containing as an essential active ingredient a monochlorophenyl acetic acid.

8. A plant regulant composition containing as an essential active ingredient 2-chlorophenyl acetic acid.

9. A plant regulant composition containing as an essential active ingredient 4-chlorophenyl acetic acid.

10. A plant regulant composition containing as an essential active ingredient a monobromophenyl acetic acid.

11. In the propagation of plants the method of regulating the growth characteristics of the plant which comprises treating the plant with a monocarboxylic acid having a non-carboxyl hydrogen replaced by an aromatic ring having a nuclear halogen substituent.

12. In the propagation of plants the method of regulating the growth characteristics of the plant which comprises treating the plant with a monocarboxylic acid having a non-carboxyl hydrogen replaced by a benzene ring having a nuclear halogen substituent.

13. In the propagation of plants the method of regulating the growth characteristics of the plant which comprises treating the plant with an aliphatic monocarboxylic acid having a non-carboxyl hydrogen replaced by a benzene ring having a nuclear chlorine substituent.

14. In the propagation of plants the method of regulating the growth characteristics of the plant which comprises treating the plant with an aliphatic monocarboxylic acid having at least two and not more than nine carbon atoms and having a non-carboxyl hydrogen replaced by a benzene ring having a nuclear halogen substituent.

15. In the propagation of plants the method of regulating the growth characteristics of the plant which comprises treating the plant with acetic acid having a non-carboxyl hydrogen replaced by a benzene ring having a nuclear halogen substituent in not more than two positions.

16. In the propagation of plants the method of regulating the growth characteristics of the plant which comprises treating the plant with acetic acid having a non-carboxyl hydrogen replaced by a benzene ring having a nuclear chlorine substituent.

17. In the propagation of plants the method of regulating the growth characteristics of the plant which comprises treating the plant with a monochlorophenyl acetic acid.

18. In the propagation of plants the method of regulating the growth characteristics of the plant which comprises treating the plant with 2-chlorophenyl acetic acid.

19. In the propagation of plants the method of regulating the growth characteristics of the plant which comprises treating the plant with 4-chlorophenyl acetic acid.

20. In the propagation of plants the method of regulating the growth characteristics of the plant which comprises treating the plant with a monobromophenyl acetic acid.

21. A plant regulant composition comprising in admixture with a water-soluble diluent an aliphatic monocarboxylic acid having less than nine carbon atoms and having a non-carboxyl hydrogen replaced by a benzene ring having a nuclear halogen substituent.

22. An anti-drop composition for use in delaying separation of parts of plants due to deterioration of the absciss layer which contains as an essential active ingredient monocarboxylic acid having a non-carboxyl hydrogen replaced by an aromatic ring having a nuclear halogen substituent.

23. An anti-drop composition for use in delaying separation of parts of plants due to deterioration of the absciss layer which contains as an essential active ingredient in aliphatic monocarboxylic acid having at least two and not more than nine carbon atoms and having a non-carboxyl hydrogen replaced by a benzene ring having a nuclear halogen substituent.

24. In the propagation of plants the method of retarding the normal separation of parts due to deterioration of the absciss layer which comprises treating at the imminence of abscission at least the portion of the plant having absciss layers with monocarboxylic acid having a non-carboxyl hydrogen replaced by an aromatic ring having a nuclear halogen substituent.

25. In the propagation of plants the method of retarding the normal separation of parts due to deterioration of the absciss layer which comprises treating at the imminence of abscission at least the portion of the plant having absciss layers with an aliphatic monocarboxylic acid having less than nine carbon atoms and having a non-carboxyl hydrogen replaced by a benzene ring having a nuclear halogen substituent.

26. A fortified plant nutrient composition comprising plant nutriment and a small amount of a monocarboxylic acid having a non-carboxyl hydrogen replaced by an aromatic ring having a nuclear halogen substituent.

JOHN F. LONTZ.